Dec. 4, 1962  W. H. VAN DER MEI  3,066,586
PHOTOGRAPHIC CAMERA
Filed July 5, 1955  3 Sheets-Sheet 1

United States Patent Office 3,066,586
Patented Dec. 4, 1962

3,066,586
PHOTOGRAPHIC CAMERA
Wietse Hendrik van der Mei, Apeldoorn, Netherlands, assignor to Voigtlander Aktiengesellschaft, Braunschweig, Germany, a corporation of Germany
Filed July 5, 1955, Ser. No. 520,001
Claims priority, application Germany July 9, 1954
5 Claims. (Cl. 95—10)

This invention relates to photographic cameras provided with means for the adjustment of light values and has particular relation to cameras comprising novel and improved adjusting means of this type.

In photographic cameras, the conventional means for the adjustment of light values comprises a first member for adjusting the shutter time and a second member for adjusting the diaphragm. Setting of the light values is thus effected by adjustment of two members which are rotatable relative to the camera body and the shutter, respectively, and whose position is never fixed. As a consequence of this, even manual adjustment is not very convenient. Moreover, in order to select a predetermined shutter time, or a predetermined diaphragm value, based on the adjusted light value the beforementioned adjusting members must be turned in coupled relation. The disadvantage of coupling these two members will be particularly apparent if it is contemplated to simplify adjustment of the shutter, in a manner known by itself, by using a single actuating element. Such an element effects during its turning and displacement, various adjusting functions. It can be operatively connected with the two adjusting members on the shutter only by means of a so-called differential gear. Differential gears are relatively complicated structural elements. They engage the shutter gear on the outside and thus objectionably increase the diameter of the shutter. Moreover, they cannot be built in in the camera body. The arrangement of such a differential gear is also necessary if an exposure meter is provided in the camera proper and if an operative connection between the light value adjustment of the shutter and the indication of the exposure meter, is desired.

Furthermore, in the conventional "light value" shutters, the scale of the shutter times and the diaphragm scale are arranged at a considerable distance from each other. In selecting a suitable time-diaphragm combination, such arrangement requires a continuous shifting of the view in alternate directions and renders the adjustment itself time-consuming and troublesome.

The main object of the present invention is to overcome the above mentioned disadvantages of conventional devices for adjustment of the light values in photographic cameras. This is attained by providing the shutter with a light value adjustment arrangement in which the light value is adjusted by means of a single actuating member movable relative to a scale or mark which is stationary relative to the camera. In addition to this light value adjusting member, there is only one other adjusting member, which is simultaneously adjustable relative to both a time scale and a diaphragm scale and by means of which the desired time-diaphragm combination can be selected or adjusted.

The advantage of such a device which has been described above by its functions only, becomes particularly evident if it is mechanically coupled with an exposure meter built in in the camera. This requires only the provision of a mechanical shafting which carries on its end a pinion or the like which is in mesh with the adjusting member for the light value. Thereby the use of any hitherto required differential gear becomes unnecessary. In order to attain this, according to the invention, opposite ends of the iris diaphragm blades are connected with respective ones of the above mentioned adjusting members for the diaphragm values and for shutter times. The "diaphragm" adjusting member is thereby adjustable according to a light value scale, while the "time-diaphragm" adjusting member is adjustable according to a time-diaphragm scale. The parts are mutually pre-adjusted at the adjustment of the light values, by positioning them in the proper position at a certain brightness. As already mentioned above, the adjusting member for the time-diaphragm-ratio is connected with the other rotating ring of the diaphragm and also connected with the time-adjusting mechanism of the camera shutter so that, upon its adjustment to a longer shutter time, the diaphragm value decreases while the light value is constant, and vice versa.

The appended drawings illustrate by way of example some embodiments of the invention, to which the invention is not limited.

In the drawings, FIGURE 1 is a substantially simplified diagrammatic illustration of the light value adjusting means according to the invention, and serves to illustrate operation of these means;

Figure 1:
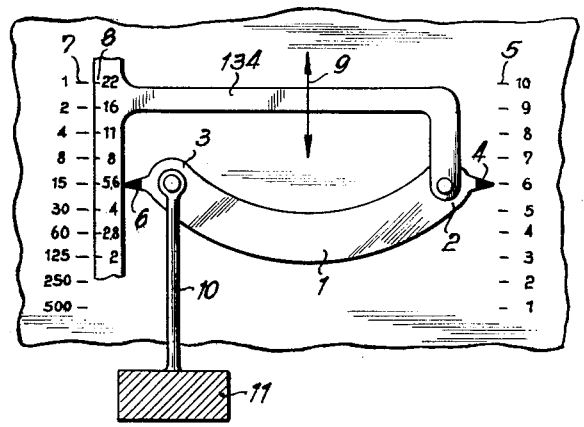

Referring now to the drawings in detail, in FIGURE 1 reference numeral 1 denotes one of the blades of the iris diaphragm mechanism, of a camera, the end 2, as well as end 3 of said blade being adjustable. End 2 of blade 1 is thereby adjustable by movement of mark 4, provided thereon, relative to a light value scale 5 which is stationary relative to the camera. The other end 3 of blade 1 has mark 6 cooperable with shutter time scale 7, which is stationary in the camera, and simultaneously with diaphragm scale 8. The latter is connected by member 134 with end portion 2 of blade 1 in such a manner that scale 8 takes part in the displacement motion of end portion 2 in the directions indicated by arrow 9. End portion 3 of diaphragm blade 1 is coupled with the shutter time adjusting mechanism 11 through coupling rod 10.

In this device, the principle of which is illustrated in FIGURE 1, the diaphragm is adjusted by means of the diaphragm blades 1, which form a summation gear member in combination with the scales of equal divisions, which are graduated in such manner that the values represented by adjacent scale marks correspond to the ratio 1:2. In this arrangement, adjustment of blade end portion 2 relative to light value scale 5 yields a pre-adjustment of the diaphragm corresponding to the adjusted light value. Simultaneously, diaphragm scale 8 is displaced relative to shutter time scale 7 in such a manner that the double scale formed by elements 7 and 8 indicates all time-diaphragm-combinations which are applicable to the adjusted light value. By adjusting the other diaphragm blade end 3, with its mark 6, any desired diaphragm combination can be selected and adjusted. The above mentioned connection of diaphragm blade end 3, through coupling rod 10, with the time adjusting mechanism 11 of the shutter is constructed in such a manner that adjustment of diaphragm blade end 3 in the direction of a larger diaphragm opening results in the adjustment of correspondingly shorter shutter times.

Figure 2:
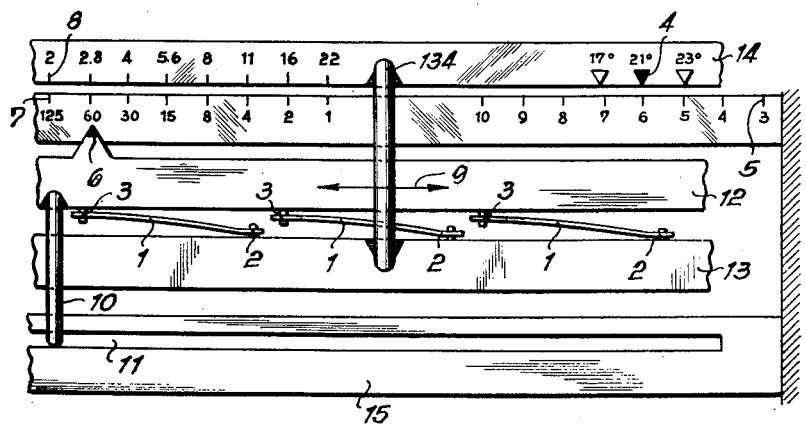
FIG. 2 is a somewhat diagrammatic development view of the main parts of a shutter provided with the light value adjusting means of the invention.

In FIG. 2, parts identical with those shown in FIG. 1 are denoted by the same reference numerals as in FIGURE 1. The ends 3 of three diaphragm blades 1 shown in FIGURE 2 are connected articulately, or, if necessary, by insertion of a special cam drive, with a time-diaphragm adjusting ring 12, which carries mark 6. The other ends 2 of the blades are connected in a similar manner with a rotatable diaphragm ring 13, which, in turn, is coupled with diaphragm adjusting ring 14 and can be adjusted by a mark 4 relative to a light value scale 5, which is stationary in the camera, in the directions indicated at 9. In order to take into consideration various film sensitivities, several marks 4 of for example, different colors can be provided, each of these marks being indicated as applicable to a film of predetermined sensitivity. Reference numeral 134 indicates the coupling member between parts 13 and 14. The time-diaphragm-adjusting member 12 is firmly connected with the shutter time adjusting mechanism 11 of camera shutter 15 by connecting member 10. The operation of this arrangement corresponds in every respect to the operation of the arrangement described in connection with FIGURE 1.

Figure 3:
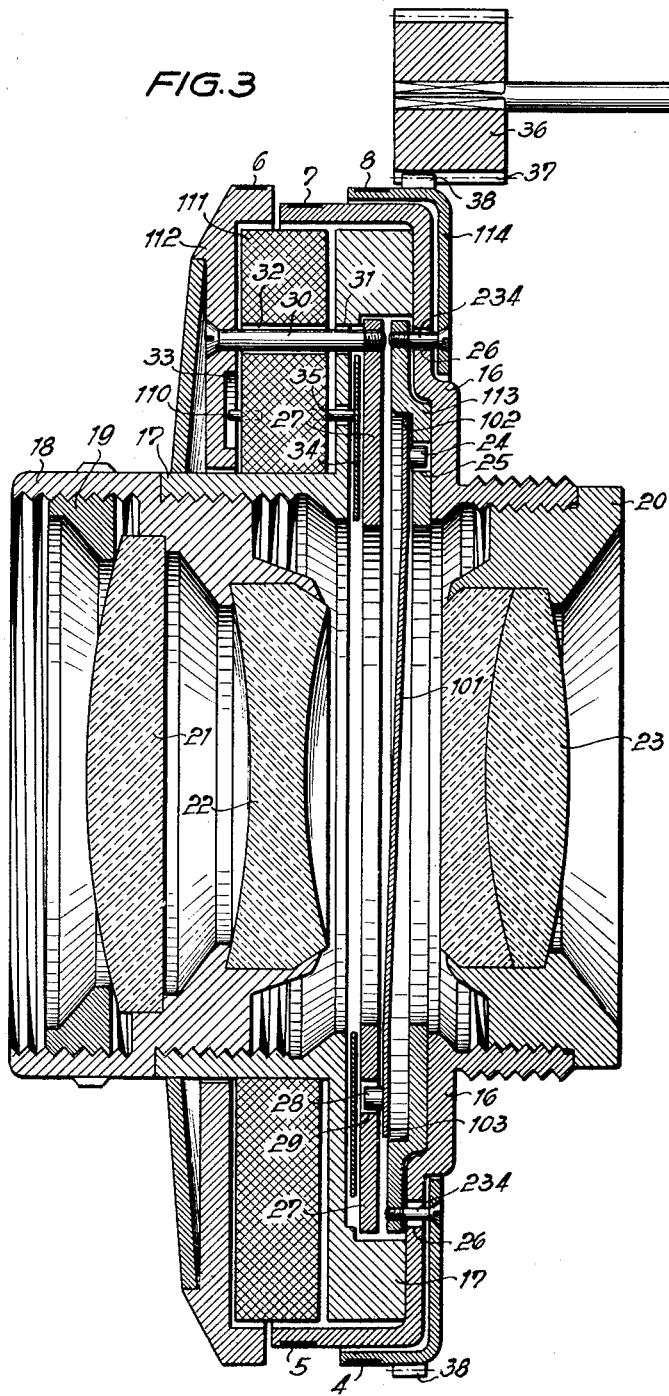
FIG. 3 is an axial sectional view through a shutter embodying the light value adjusting means of the invention, and illustrating a transmission member coupling the adjusting means with an exposure meter built-in in the camera.

FIGURE 3 illustrates in sectional view a shutter based on the principle illustrated in FIGURE 2. In FIGURE 3, reference numeral 16 denotes the shutter casing, in which are threaded the mounting elements 17, 18, 19 and 20 for objective members 21, 22 and 23. The interior of the shutter houses the diaphragm blades 101, only one of the latter being shown for the sake of clarity.

The end 102 of diaphragm blade 101 is connected with a conventional rotatable diaphragm ring 113 by means of a plug or pin 24 engaging a bore 25 in ring 113. Ring 113 is coupled with diaphragm adjusting ring 114 positioned at the rear end of the shutter casing and having an axially extending rim which partially covers the peripheral surface of the shutter casing. Screws 234 extend through slots 26 in shutter casing 16, and each has its head seated in diaphragm ring 114 and is threaded into diaphragm adjusting ring 113, to serve as a coupling member between rings 113 and 114. The other end 103 of diaphragm blade 101 is connected with a second rotatable diaphragm ring 27 by means of a pin or plug 28 engaged in an arcuate slot 29 of ring 27. Ring 27 is connected with the conventtional shutter time adjusting ring 112, positioned at the front end of the shutter casing, by means of a bolt 30 which has its head seated in ring 112, and which has a stem extending through the slot 32 in shutter mechanism 111 and a slot 31 in member 17, and is threaded into ring 27. Shutter time adjusting ring 112 is formed with cam-shaped recesses 33 which, when ring 112 is rotated, coact with pins 110 of adjusting mechanism 111 which actuates the shutter sectors 34 through connections 35. Shutter time adjusting ring 112 is provided with a mark 6 whereby this ring may be adjusted relative to a shutter-time scale 7 on the casing 16, as well as relative to a diaphragm scale 8 on the diaphragm adjusting ring 114. Shutter casing 17 also carries a light value scale 5, and mark 4 of diaphragm adjusting ring 114 is adjustable relative to scale 5.

If now diaphragm adjusting ring 114 is adjusted to a certain selected stationary light value relative to the light value scale 5, the ends 102 of diaphragm blade 101 are caused to be displaced by connections 234, 113, 25 and 24, whereby the iris diaphragm is pre-adjusted in accordance with the selected light value. Simultaneously, diaphragm scale 8 of diaphragm adjusting ring 114 has been brought into such a position relative to shutter time scale 7 that all the resulting time-diaphragm-combinations correspond to the adjusted light value. When mark 6 of shutter time adjusting ring 112 is adjusted either to the selected shutter time, or to the selected diaphragm value of scales 7 or 8, the other ends 103 of the diaphragm blades 101 are displaced by means of connections 30, 27, 29 and 28, and simultaneously, by means of connection 110, the shutter time adjusting mechanism 111 is controlled.

According to a further particularly advantageous embodiment of the invention, the device of the invention is mechanically coupled with an exposure meter built-in in the camera. The gearing for effecting this coupling includes, as a terminal member, the pinion 36 shown in FIG. 3 and having its teeth 37 meshing with the knurled surface 38 of diaphragm adjusting ring 114.

Figure 4:
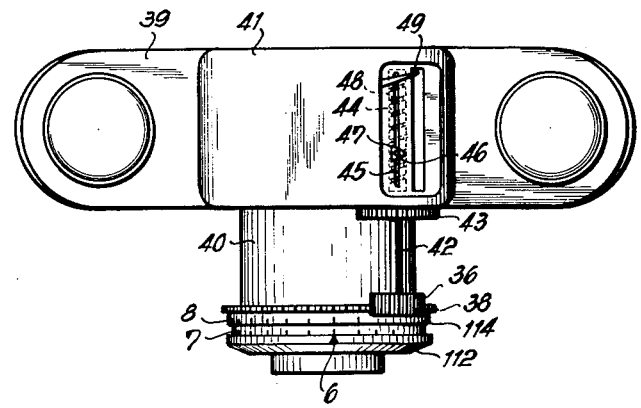
FIG. 4 is a top plan view of a camera having a tublar objective housing mounting a shutter incorporating the invention and including an exposure meter built-in in the camera and coupled with the shutter.
Figure 5:
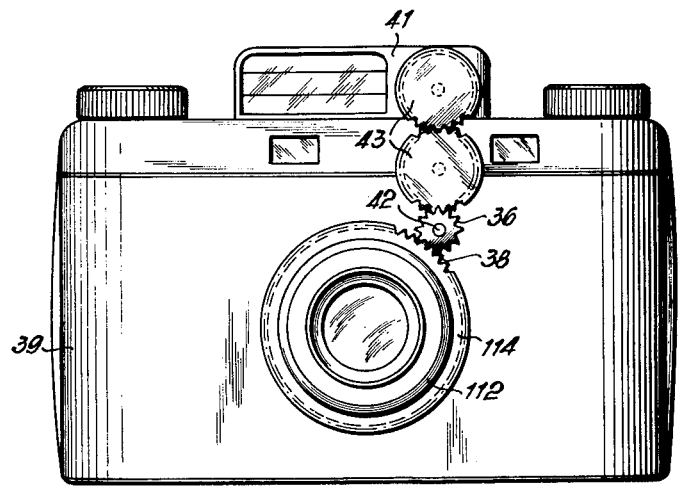
FIG. 5 is a front elevational view of the camera shown in FIG. 4.

In FIGURES 4 and 5, reference numeral 39 denotes the camera, 40 denotes the tubular objective housing and 41 the exposure meter built in the camera. 114 denotes again the diaphragm adjusting ring provided with diaphragm scale 8, 7 denotes the shutter time scale which is stationary relative to the casing, and 112 denotes the shutter time adjusting ring provided with mark 6. Pinion 36, which engages the knurled surface 38 of the diaphragm adjusting ring 114, is mechanically connected by shaft 42 and gears 43, with a worm shaft 44 journaled in exposure meter 41. A slot 45 is formed in the wall of the exposure meter casing in alignment with the worm shaft 44 and extends throughout the length of this worm shaft. A guide pin 46 extends through the slot 45 and engages the thread of the worm shaft 44, the guide pin 46 carrying a displaceable follow-up mark 47. By turning the diaphragm adjusting ring 114, mark 47 can be brought in conformity with the respective position of pointer 49 of the exposure meter. In order to linearize the rotary movement of the coupling gear in operating the pin 46 to bring the mark 47 into conformity with the indicator 49 of the exposure meter, the thread of worm gear 48 may have a suitable design. For example, its pitch may be varied in either an increasing or decreasing direction along its length.

It will be understood from the above that this invention is not limited to the specific elements, designs, constructions and other details specifically described above and illustrated in the drawings and can be carried out with various modifications without departing from the scope of the invention as defined in the appended claims.

The term "linearized scale" is used herein to denote photographic scales which have equal divisions, each two adjoining divisions of which correspond to values having the ratio of 1:2.

What is claimed is:

1. A photographic camera construction comprising a camera body, an optical unit mounted on said camera body, said unit having an optical axis and including an adjustable diaphragm, a first diaphragm aperture adjusting member rotatable about said optical axis, a second diaphragm aperture adjusting member also rotatable about said optical axis, each of said aperture adjusting members being rotatable through a limited range independently of the other and each serving upon rotation, while the other is stationary, to adjust the size of the diaphragm aperture, a shutter speed adjusting member, an indicating member movably mounted on said camera body for movement to different positions thereon in accordance with changes in an exposure value representing a relationship between shutter speed and diaphragm aperture, means operatively connecting said first diaphragm aperture adjusting member to said shutter speed adjusting member to move one of them from movement of the other so as to change the diaphragm aperture to an extent complementary to a change in shutter speed, without causing any change in exposure value, and other means operatively connecting said second diaphragm aperture adjusting member to said indicating member to move said second diaphragm adjusting member and said indicating member simultaneously to indicate a change in said exposure value without changing the position of said shutter speed adjusting member.

2. A photographic camera construction comprising an objective having an optical axis and including an adjustable shutter, a shutter casing, and an adjustable diaphragm; a first diaphragm aperture adjusting member rotatable about said optical axis; a second diaphragm aperture adjusting member also rotatable about said optical axis; each of said diaphragm aperture adjusting members being rotatable through a limited range independently of the other and each serving, upon rotation and while the other is stationary, to adjust the size of the diaphragm aperture; a shutter speed adjusting member; means operatively connecting one of said diaphragm aperture adjusting members to said shutter speed adjusting member to move one of the latter members responsive to movement of the other thereof so as to change the diaphragm aperture to an extent complementary to a change in shutter speed without effecting any change in exposure value; a fixed scale of exposure values provided on said objective; a mark movable with the other of said diaphragm adjusting member, said mark being cooperable with said scale of exposure values and adjustable relative thereto to the measured exposure value on said scale; a fixed shutter time scale provided on said objective; a diaphragm scale provided on said other of said diaphragm aperture adjusting member and cooperable with said shutter time scale, said diaphragm scale being adjustable relative to said shutter time scale upon adjustment of said mark relative to said exposure value scale; a mark provided on said shutter speed adjusting member cooperable with said shutter time scale and said diaphragm scale; the shutter speed adjusting member and said one of said diaphragm aperture adjusting members being adjustable by cooperation of said last-named mark with respect to said shutter time scale and said diaphragm scale respectively, and in conformity with the measured exposure value.

3. A photographic camera as claimed in claim 2, in which said shutter speed adjusting member is connected with the speed adjusting mechanism of the shutter in such a manner that adjustment of the diaphragm aperture in the direction of forming larger diaphragm openings, effects setting of faster shutter speeds within the range of the previously effected exposure value adjustment.

4. A photographic camera as claimed in claim 2, including an exposure meter built-in in the camera; a follow-up device movable to the indicating position of said exposure meter; and motion transmitting means interconnecting said other of said diaphragm aperture adjusting members and said follow-up device to move said follow-up device to the indicating position of said exposure meter responsive to rotation of said other of said diaphragm aperture adjusting members.

5. A photographic camera construction, as claimed in claim 2, comprising an additional rotatable ring carrying said mark movable with the other diaphragm adjusting member, and coupled with the latter, said additional diaphragm ring being rotatably mounted on the outer surface of said objective and being operable to effect rotation of said other diaphragm adjusting member.

References Cited in the file of this patent

UNITED STATES PATENTS

| | | |
|---|---|---|
| 1,447,906 | Snyder et al. | Mar. 6, 1923 |
| 1,469,763 | Snyder et al. | Oct. 2, 1923 |
| 1,543,208 | Fairchild | June 23, 1925 |
| 1,974,433 | Riszdorfer | Sept. 25, 1934 |
| 2,282,659 | Kun | May 12, 1942 |
| 2,576,813 | Simons | Nov. 27, 1951 |
| 2,590,161 | Dorsey | Mar. 25, 1952 |
| 2,596,328 | Dorsey | May 13, 1952 |

FOREIGN PATENTS

| | | |
|---|---|---|
| 7,787 | Great Britain | 1914 |
| 793,850 | France | Dec. 2, 1935 |
| 808,644 | France | Nov. 14, 1936 |
| 523,785 | Belgium | Nov. 14, 1953 |